(12) United States Patent
Ogura et al.

(10) Patent No.: US 6,359,616 B1
(45) Date of Patent: Mar. 19, 2002

(54) COORDINATE INPUT APPARATUS

(75) Inventors: Tsuyoshi Ogura; Harumi Takase; Shoji Suzuki; Yoshiyuki Kikuchi; Akira Yanai, all of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/336,420

(22) Filed: Jun. 17, 1999

(30) Foreign Application Priority Data

Jun. 23, 1998 (JP) ............................................ 10-176372

(51) Int. Cl.$^7$ ................................................. G09G 5/00
(52) U.S. Cl. ........................ 345/173; 345/156; 345/174; 345/179; 178/18.01; 178/18.02; 178/18.03; 178/18.04; 178/18.05
(58) Field of Search ................................ 345/173, 174, 345/156, 179; 178/18.01, 18.02, 18.03, 18.04, 18.05

(56) References Cited

U.S. PATENT DOCUMENTS

| 4,710,758 | A | * 12/1987 | Musser et al. ............... 340/712 |
| 5,677,711 | A | 10/1997 | Kuo |
| 5,982,352 | A | * 11/1999 | Pryor ........................... 345/156 |
| 6,104,386 | A | * 8/2000 | Yaotani ........................ 345/173 |

* cited by examiner

Primary Examiner—Richard Hjerpe
Assistant Examiner—Jean Lesperance
(74) Attorney, Agent, or Firm—Brinks Hofer Gilson & Lione

(57) ABSTRACT

A coordinate input apparatus for correcting the shift in an input coordinate system between different coordinate input apparatuses relative to an opening of each apparatus. A data processing block captures information from a coordinate detector PD to determine whether a tapping operation has been performed and determine whether the finger is being slid on a sensor board. A data analyzing block compares inputted absolute coordinates (X, y) with minimum coordinate values (Xmin, Ymin) and maximum coordinate values (Xmax, Ymax) indicative of a preset effective pointing area on the sensor board. A control block controls the data analyzing block to transfer replaced minimum coordinate values (Xmin, Ymin), maximum coordinate values (Xmax, Ymax) and the values of absolute coordinates (X, Y) to a data correcting block. Based on these minimum coordinate values (Xmin, Ymin) and maximum coordinate values (Xmax, Ymax), the data correcting block transforms the absolute coordinates (X, Y) into display coordinates. The control block moves a screen window or a cursor to a position indicated by absolute coordinates (X', Y') on a display screen.

5 Claims, 5 Drawing Sheets

COORDINATE INPUT APPARATUS

BACKGROUND OF THE INVENTION

1. Field of the Invention

The present invention generally relates to a coordinate input apparatus for use in operating a cursor and a window on a monitor screen.

2. Description of Related Art

A mouse and a track ball are conventionally known as pointing devices for use on computers. Recently, a pointing device called a pad, a touch pad, or a track pad is also available. The pad is embedded in a note-size personal computer or externally attached to a desktop computer. Unlike the mouse, the pad need not be moved around on desktop for a pointing operation, thereby contributing to desktop space saving.

To move a cursor (also called a pointer) on the monitor screen by use of the touch pad, the user may only touch the planar operating surface of several centimeters square of pad with the finger and slide it on the pad. Like the mouse, the touch pad is arranged with the left and right buttons. In addition to use of these buttons, the user can tap an operating surface with the finger, like clicking the left button of the mouse, to perform various pointing operations such as selecting or moving an object displayed on the screen.

The tapping operation allows the user, in addition to the above-mentioned click operation, to perform a double-click operation (for use in starting an application program for example) and a drag operation (a displayed object is dragged while the left button of the mouse is kept pressed to a desired position) with a single finger.

Thus, the touch pad performs, when its operating surface is operated by the user finger, the substantially the same functions as the cursor movement and the left-button click operation of the mouse. The pad is installed on the bottom surface of the keyboard of a note-type personal computer. When the user touches the operating surface of the pad through the opening, the coordinate positional information about the point of the touch is sent to the computer.

A coordinate information analyzing block transforms the coordinate positional information received from the touch pad into coordinate values on the display device. In other words, the coordinate information analyzing block performs a coordinate system transforming operation from an input-side coordinate system to a display-side coordinate system. The input-side coordinate system is defined by maximum coordinate values (Xmax, Ymax) and minimum coordinate values (Xmin, Ymin) in the coordinate positional information on a two-dimensional plane to be inputted.

However, these maximum and minimum coordinate values differ between computers depending on the touch pad installation position in the opening. To be more specific, as shown in FIGS. 6A and 6B, the installation position relative to opening K of product B is shifted by "ΔX" for example in lateral direction (X-axis) relative to the installation position in opening K of product A. FIG. 6A is a top view illustrating superimposition of opening K of case P on touch pad T. FIG. 6B is a cross section of FIG. 6A along line 6B–6B.

Likewise, the installation position of touch pad T may be shifted by "ΔY" in vertical direction (Y-axis). Further, the installation position of touch pad T may be shifted both by "ΔX" in lateral direction and "ΔY" in vertical direction relative to the opening. Consequently, an effective area defined by the maximum coordinate values (Xmax, Ymax) and the minimum coordinate values (Xmin, Ymin) may not be fully utilized for coordinate input.

Thus, the installation position of touch pad T slightly differs from product to product. The degree and direction of the shift cannot be known until the fabrication of products is completed. Therefore, the coordinate system must be individually set to each product or restricted to the installation on a predetermined position in which a smaller effective area is provided to preclude coordinate input errors.

SUMMARY OF THE INVENTION

It is therefore an object of the present invention to provide a coordinate input apparatus that, if the input coordinate system differs between computer products, corrects the shift of the input coordinate system relative to the opening of each computer product.

In carrying out the invention and according to one aspect thereof, there is provided a coordinate input apparatus comprising: a coordinate detector installed on a case so as to be exposed through a window provided on the case, the coordinate detector being provided with an operating surface having a predetermined size that is operated with a coordinate indicator, a position indicated by the coordinate indicator on the operating surface being outputted as coordinate data about two-dimensional coordinates; a storage for storing range coordinate data about two-dimensional coordinates indicative of a rectangular coordinate input range in which a coordinate input operation is performed by the coordinate indicator on the operating surface; a data analyzing block for changing the range coordinate data according to the coordinate data inputted by the coordinate indicator; a data correcting block for transforming, based on the range coordinate data, the coordinate data into display coordinate data corresponding to coordinates on a display screen of an image display device; and a display control block for displaying the display coordinate data to the display screen of the image display device.

Thus, the range coordinate data for defining the rectangular coordinate input range is rewritten by the coordinate data indicated by the coordinate indicator. Consequently, the rectangular coordinate input range of any coordinate input apparatus can be always adapted to the operating surface exposed through the window. This eliminates the shift of the rectangular coordinate input range on the operating surface between different coordinate input apparatuses.

In carrying out the invention and according to another aspect thereof, there is provided a coordinate input apparatus wherein the range coordinate data is composed of minimum coordinate data and maximum coordinate data indicative of the rectangular coordinate input range.

Consequently, the rectangular coordinate input range can be defined by two points of the maximum coordinate data and the minimum coordinate data.

In carrying out the invention and according to still another aspect thereof, there is provided a coordinate input apparatus wherein, if the coordinate data is smaller than the minimum coordinate data, the data analyzing block replaces the coordinate data with the range coordinate data and, if the coordinate data is larger than the maximum coordinate data, the data analyzing means replaces the coordinate data with the range coordinate data.

Consequently, the rectangular coordinate input range of any coordinate input apparatus can be always adapted to the operating surface exposed through the window. This eliminates the shift of the rectangular coordinate input range on the operating surface between different coordinate input apparatuses.

In carrying out the invention and according to yet another aspect thereof, there is provided a coordinate-input apparatus wherein the rectangular coordinate input range is set inside a frame of the window.

Consequently, the rectangular coordinate input range can be expanded up to the inner circumference of the frame of the window. Therefore, even if there occurs a shift between the window of the case of the coordinate input apparatus and the installation of the operating surface, operating of the operating surface by the user with the coordinate indicator converges the rectangular coordinate input range to the operating surface inside the window, thereby eliminating the variations in rectangular coordinate input range between different coordinate input apparatuses.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

Figure 1:
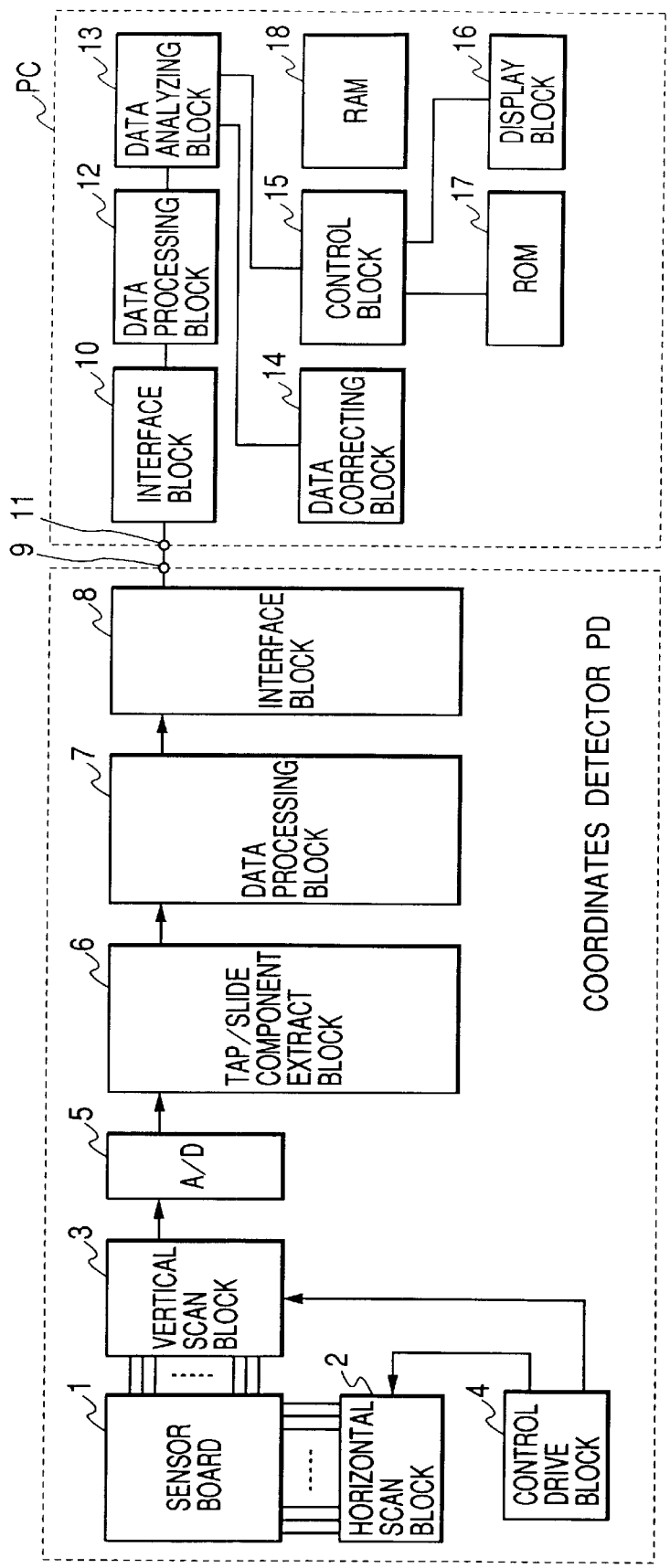
FIG. 1 is a block diagram illustrating a constitution of a coordinate input apparatus practiced as one preferred embodiment of the invention.

Now, referring to FIG. 1, a coordinate input apparatus practiced as one preferred embodiment of the invention is largely constructed by a coordinate detector PD and a coordinate output device PC. The coordinate detector PD is a touch pad described earlier for example. The coordinate output device is a personal computer for example to which the touch pad is connected.

Figure 2:
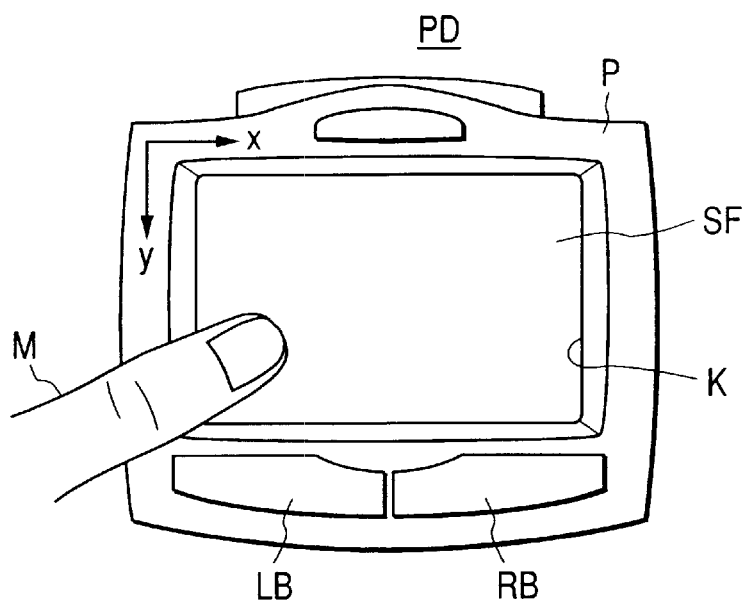
FIG. 2 is a top view illustrating an external view of a pointing device PD based on the embodiment shown in FIG. 1.

Before describing the components of the coordinate detector PD, the mechanical constitution thereof will be described briefly. As shown in FIG. 2, a left button LB and a right button RB correspond to a mouse left button and a muse right button, respectively, the functions of the LB and RB being the same as those of the mouse buttons. A rectangular area indicated by reference SF in an opening K represents an operating surface to be operated by a coordinate indicator (for example, a user finger) M. In what follows, the coordinate indicator is the user finger.

A sensor board (or a touch pad) 1 shown in FIG. 1 has a matrix of plural horizontal scan lines (in X-axis direction shown in FIG. 2) and plural vertical scan lines (in Y-axis direction). The touch pad 1 is adapted to change the current values of these scan lines when the user finger touches the pad. To be more specific, the coordinate detector PD of the above-mentioned embodiment uses a capacitance-type tablet in which a capacitance film is disposed on its front and rear surfaces with electrode matrices. A pulse is imparted from one end of the capacitance film to form an electric field.

This constitution reduces the capacitance of the portion of the capacitance film touched by the finger M through the operating surface SF. The change in the capacitance is converted into a current change, by which the position of the portion touched by the finger N is detected. That is, the coordinate position of the touched portion is specified by the intersection between horizontal and vertical scan lines. If releasing of the finger M off the operating surface SF is detected, a tapping operation described earlier can be detected. In addition, the computation of a change in the position of touched portion allows the detection of a sliding operation of the finger M on the operating surface SF. It should be noted that the pad may be of pressure sensitive type rather than the above-mentioned capacitance type.

The horizontal scan block 2 scans the sensor board 1 in horizontal direction. Many signal outputs are connected to the horizontal scan lines of the sensor board 1. The vertical scan block 3 scans the sensor board 1 in vertical direction. Many signal inputs are connected to the vertical scan lines of the sensor board 1, generating a serial detect signal indicative of a scan state of the finger M.

This serial detect signal contains a tap component which is generated when the operating surface SF of the sensor board 1 is tapped with the finger M and a slide component which is generated when the finger M slides on the operating surface SF. The tap component includes an address component indicative of a position at which the finger M is in contact with the operating surface SF. The slide component includes an address component indicative of positions between which the finger M has slid on the operating surface SF.

The control drive block 4 supplies a scan drive signal to both the horizontal scan block 2 and the vertical scan block 3 to drive these blocks. That is, the control drive block 4 outputs a drive signal to drive the horizontal scan block 2 and the vertical scan block 3 for scanning. This supplies a scan signal to each of the scan line of the sensor board 1. When the user touches the finger M on the sensor board 1 at a desired position, a serial detect signal corresponding to the motion of the finger M is outputted from the vertical scan block 3 to an A/D (Analog to Digital) converter 5.

The A/D converter 5 converts the serial detect signal, which is an analog signal, inputted from the vertical scan block 3, into a digital signal. In addition, the A/D converter 5 outputs the digital serial detect signal to a tap/slide component extract block 6. The tap/slide component extract block 6 extracts the above-mentioned tap and slide components from the digital serial detect signal received from the A/D converter 5, separately transforms the components into three-dimensional coordinate values, and outputs these values along with the tap component and the slide component to a data processing block 7.

The data processing block 7, based on the three-dimensional coordinate values received from the tap/slide component extract block 6, determines whether a tapping operation has been performed or not. At the same time, the data processing block 7 removes noise from the slide component to correct the change in the position of the finger M in the operating surface SF two-dimensional coordinate constituted by X-axis and Y-axis to a smoother straight line or a curve. In addition, the data processing block 7 outputs the information about the corrected change in the position of the finger M in the operating surface SF two-dimensional coordinates constituted by X-axis and Y-axis to an interface block 8.

The interface block 8 transfers data with the coordinate output device PC. At the same time, the interface block 8, based on the information received from the data processing block 7, adds the tap-on/off information and the left-button and right-button on/off information for the absolute coordinates (X, Y) on the operating surface SF two-dimensional coordinates, and sends these added information to an output port 9 along with the tap and slide components.

The following describes the components of the coordinate output device PC. The interface block 10 transfers data with the coordinate detector PD, receiving the above-mentioned items of information through an input port 11. If the coordinate output device PC is a personal computer, the interface block 10 is equivalent to a known serial port or mouse port.

The data processing block 12 captures the information from the side of the coordinate detector PD, processes the captured information, and determines whether a tapping operation has been performed or not. At the same time, the data processing block 12 determines whether the finger M is sliding within a specific area on the operating surface SF. The data processing block 12 sends the decisions obtained and the absolute coordinates (X, Y) to a data analyzing block 13.

Figure 4:
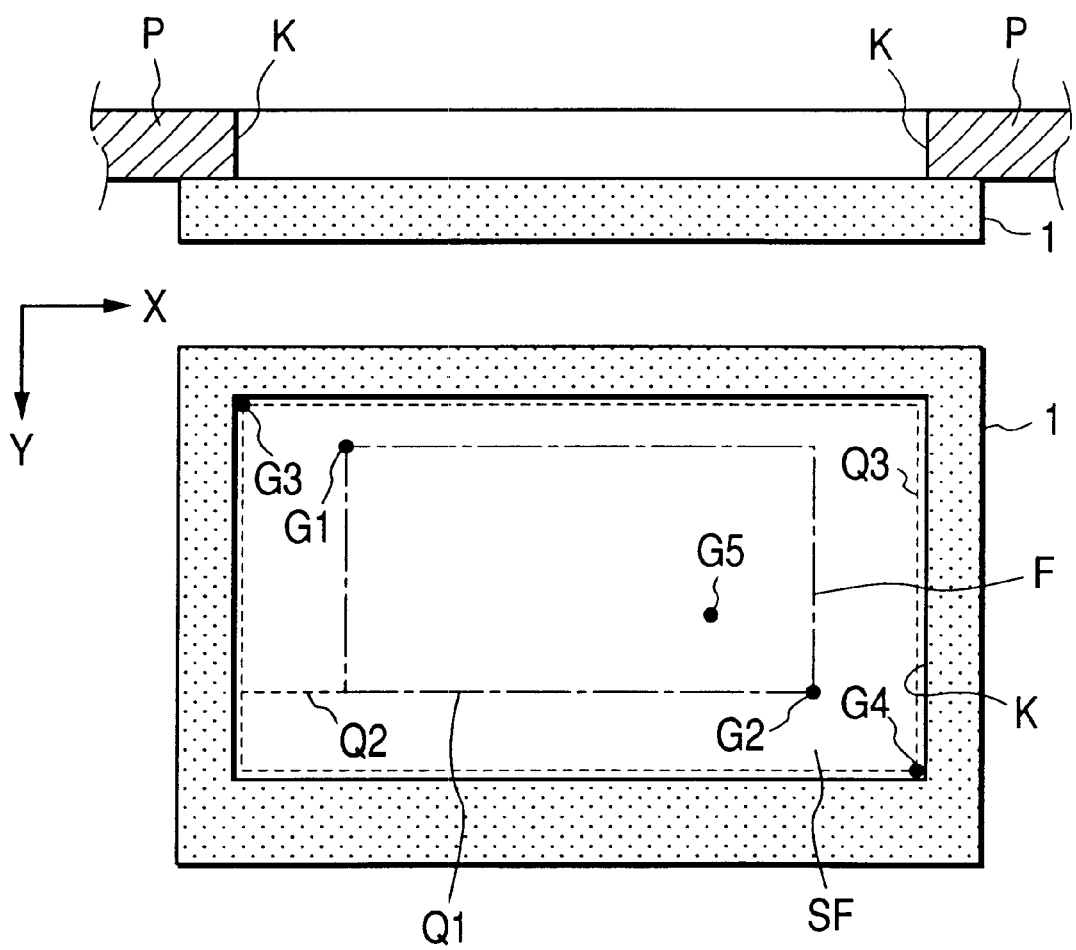
FIG. 4 is a conceptual diagram for describing an input operation on the coordinate input apparatus shown in FIG. 1.

The data analyzing block 13 determines whether the inputted absolute coordinates (X, Y) are larger or smaller relative to the preset minimum coordinate values (Xmin, Ymin) and maximum coordinate values (Xmax, Ymax) indicative of the pointing-operation effective area on the operating surface SF. As shown in FIG. 4, the initial values of the minimum coordinate values (Xmin, Ymin) and the maximum coordinate values (Xmax, Ymax) are set beforehand so that the effective area F sufficiently falls within the opening K (namely, the physical effective area) of the case P.

If the absolute coordinates (X, Y) outputted by the sensor board I upon operation of the user finger M are outside the effective area set by the initial values, the data analyzing block 13 corrects the coordinates of the initially set effective area. To be more specific, if the inputted absolute coordinates (X, Y) are larger than the preset maximum coordinate values (Xmax, Ymax), the data analyzing block 13 replaces the maximum coordinate values (Xmax, Ymax) with the absolute coordinates (X, Y). If, on the other hand, the absolute coordinates (X, Y) are smaller than the preset minimum coordinate values (Xmin, Ymin), the data analyzing block 13 replaces the minimum coordinate values (Xmin, Ymin) with the absolute coordinates (X, Y).

A control block 15 controls the data analyzing block 13 to transfer the values of the replaced minimum coordinate values (Xmin, Ymin), the maximum coordinate values (Xmax, Ymax), and the absolute coordinates (X, Y) to a data correcting block 14. Based on the replaced minimum coordinate values (Xmin, Ymin) and the maximum coordinate values (Xmax, Ymax), the data correcting block 14 transforms the absolute coordinates (X, Y) into display coordinates to be displayed on the display block 16.

A control block 15 controls the data analyzing block 13 to have the same transfer the values of the replaced minimum coordinate values (Xmin, Ymin), the maximum coordinate values (Xmax, Ymax), and the absolute coordinates (X, Y) to a data correcting block 14. Based on the replaced minimum coordinate values (Xmin, Ymin) and maximum coordinate values (Xmax, Ymax), the data correcting block 14 transforms the absolute coordinates (X, Y) into display coordinates to be displayed on the display block 16.

That is, the data correcting block 14, based on the minimum coordinate values (Xmin, Ymin) and the maximum coordinate values (Xmax, Ymax), transforms the absolute coordinates (X, Y) in the input-side coordinate system into absolute coordinates (X', Y') corresponding to the minimum coordinate values and maximum coordinate values in the display-side coordinate system. Further, the data correcting block 14 outputs the resultant absolute coordinates (X', Y') in the display side to the control block 15.

The following describes the contents of the processing for transforming the absolute coordinates (X, Y) in the input-side coordinate system into the absolute coordinates (X', Y') corresponding to the minimum coordinate values and maximum coordinate values in the display-side coordinate system. Now, let transformation F from the input-side coordinate system Z into the display-side coordinate system Z' shown in FIG. 3 be $$F(Z)=Z'.$$

Figure 3:
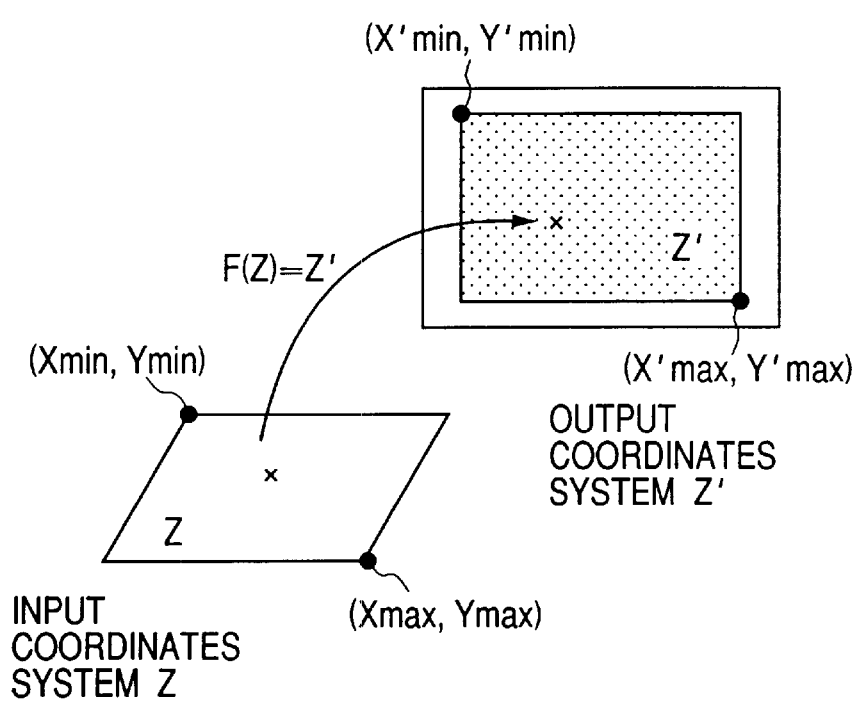
FIG. 3 is a conceptual diagram for describing coordinate transform processing in the coordinate input apparatus shown in FIG. 1.

FIG. 3 is a conceptual diagram for describing the transformation F from the input-side coordinate system Z into the display-side coordinate system Z'.

This transformation F performs expansion transformation or contraction transformation in a two-dimensional space, satisfying the following relation:

$$(X', Y')=a*(X, Y)+b.$$

To obtain the coefficients "a" and "b" used in the above-mentioned relation, a correlation between corresponding points on both the input-side coordinate system Z and the display-side coordinate Z' may only be obtained.

Therefore, the above-mentioned correlation is obtained by giving the minimum coordinate values and maximum coordinate values of both the input-side coordinate system Z and the display-side coordinate system Z'. Consequently, the data correcting block 14 obtains the minimum coordinate values (Xmin, Ymin) and maximum coordinate values (Xmax, Ymax) of the input-side coordinate system Z from the processing according to the invention and obtains the minimum coordinate values (Xmin', Ymin') and maximum coordinate values (Xmax', Ymax) of the display-side coordinate system Z' from the display block 16 (for example, a display device or a graphics window).

The control block 15 performs image display operations such as moving, on the display screen of the display block 16, a window to a position indicated by the absolute coordinates (X', Y') inputted from the data correcting block 14 and moving the cursor. The display block 16 is a display device for use on a personal computer for example. A ROM (Read Only Memory) 17 stores an operating program for the control block 15 and the minimum coordinate values (Xmin, Ymin) and maximum coordinate values (Xmax, Ymax) indicative of the effective area initially set on the operating surface SF defined by the above-mentioned format of the absolute coordinates (X, Y).

A RAM (Random Access Memory) 18 temporarily stores data associated with various processing operations performed by the control block 15. The control block 15 reads the minimum coordinate values (Xmin, Ymin) and the maximum coordinate values (Xmax, Ymax) from the ROM 17 at starting the coordinate output device PC and writes them to the RAM 18 at a predetermined area.

Further, the data analyzing block 13 compares the value of the inputted absolute coordinates (X, Y) with the minimum coordinate values (Xmin, Ymin) and maximum coordinate values (Xmax, Ymax) stored in the RAM 18. If the value of the absolute coordinates (X, Y) is found outside the area indicated by the minimum coordinate values (Xmin, Ymin) and the maximum coordinate values (Xmax, Ymax), the minimum coordinate values (Xmin, Ymin) or the maximum coordinate values (Xmax, Ymax) is corrected to the value of absolute coordinates (X, Y).

Figure 5:
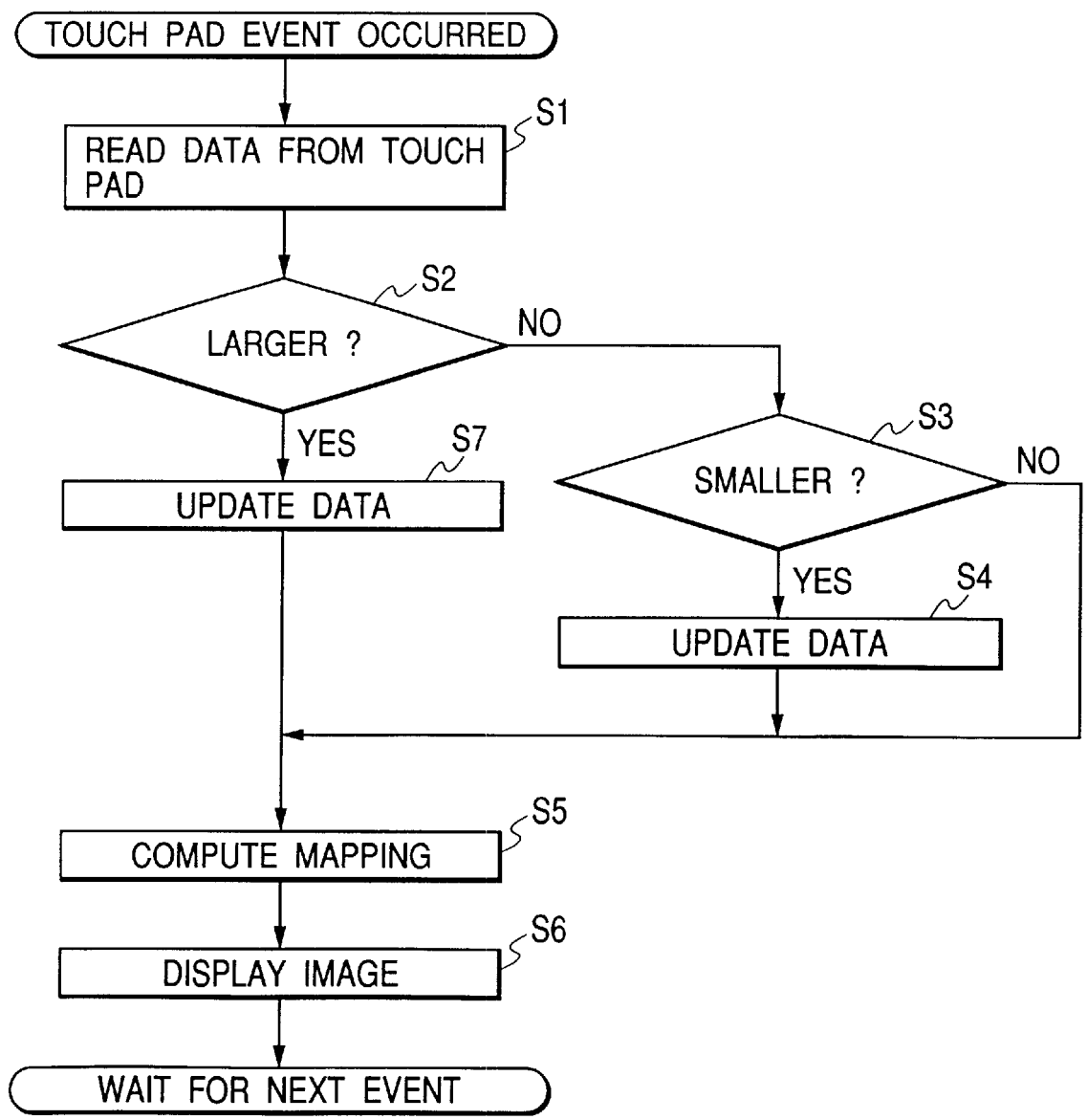
FIG. 5 is a flowchart indicative of an operation of the coordinate input apparatus shown in FIG. 1.
Figure 6A:
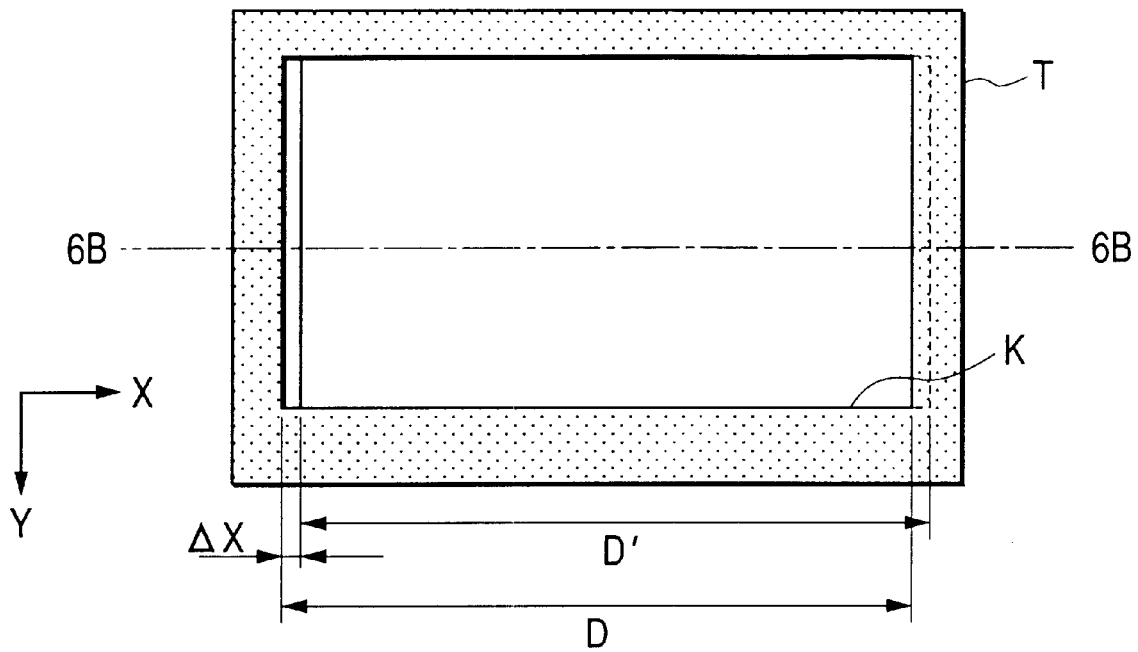
FIGS. 6A and 6B are diagrams illustrating a conventional coordinate input apparatus for describing problems thereof.
Figure 6B:
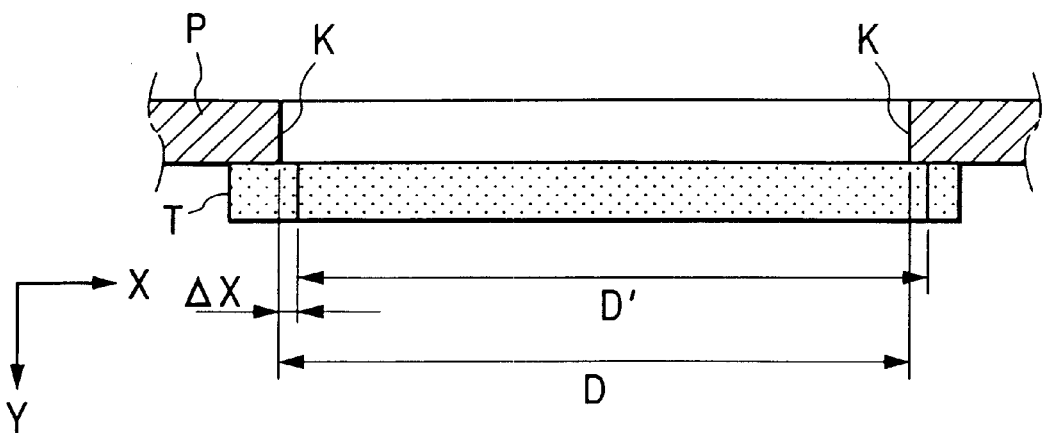

The following describes operations of the above-mentioned coordinate input apparatus with reference to FIGS. 1, 4, and 5. FIG. 4 is a conceptual diagram for describing operations of the coordinate input apparatus. In the lower half of the diagram, a conceptual figure (corresponding to X-axis and Y-axis) in the planar view of the coordinate input apparatus is shown. In the upper half of the diagram, a cross section vertical to the top of the above-mentioned figure in the lower half is shown. FIG. 5 is a flowchart indicative of operations of the coordinate input apparatus.

First, the control block 15 reads from the ROM 17 the minimum coordinate values (Xmin, Ymin) and the maximum coordinate values (Xmax, Ymax) as the initial setting values of the effective area on the operating surface SF at starting the coordinate output device PC. Then, the control block 15 writes these values to the RAM 18. It should be noted that the minimum coordinate values (Xmin, Ymin) denote the coordinates of point G1 shown in FIG. 4 and the maximum coordinate values (Xmax, Ymax) denote the coordinates of point G2.

As shown in FIG. 2, assume that point G3 on the operating surface SF is touched by the finger M. Then, in the coordinate detector PD, the horizontal scan block 2 and the vertical scan block 3 are driven for scanning by a drive signal outputted from the control drive block 4.

When the user operates a desired position on the sensor board 1 (or the operating surface SF) of FIG. 1 with the finger M while a scan signal is supplied to each scan line of the sensor board 1, a serial detect signal corresponding to the operating state of the finger M is outputted from the vertical scan block 3. This serial detect signal is converted by the A/D converter 5 into a digital signal, from which a tap component and a slide component are extracted by the tap/slide component extract block 6.

The data processing block 7 sends the tap component directly to the interface block 8 and performs noise elimination on the slide component, the resultant component being sent to the interface block 8. The interface block 8 generates tap-on/off information and button-on/off information and adds these pieces of information to the data received from the data processing block 7, the resultant data being sent to the coordinate output device PC through the output port 9. Then, in the coordinate output device PC, the information supplied to the input port 11 is supplied to the data processing block 12 through the interface block 10.

This completes the capturing in the coordinate output device PC of the data from the coordinate detector PD. At this moment, based on the tap-on/off information received from the side of the coordinate detector PD, the data processing block 12 detects that a tapping operation has been performed. This makes the control block 15 detect the occurrence of an event in the coordinate detector PD, starting the processing as described in the flowchart shown in FIG. 5.

Now, in step S1, the data processing block 12 receives the values of absolute coordinates (X3, Y3) of the two-dimensional coordinate system at point G3 on the sensor board 1 through the interface block 8 and the interface block 10. Then, the data processing block 12 outputs the value of absolute coordinates (X3, Y3) to the data analyzing block 13.

In step S2, the data analyzing block 13 compares the inputted values of absolute coordinates (X3, Y3) with the maximum coordinate values (Xmax, Ymax) stored in the RAM 18. That is, the data analyzing block 13 determines whether "X3" in the absolute coordinates (X3, Y3) is larger or smaller than "Xmax" of the maximum coordinate values (Xmax, Ymax).

At the same time, the data analyzing block 13 determines whether "Y3" in the absolute coordinates (X3, Y3) is larger or smaller than "Ymax" of the maximum coordinate values (Xmax, Ymax). At this moment, the absolute values (X3, Y3) at point G3 are not larger than the maximum coordinate values (Xmax, Ymax) at point G2 in both X-coordinate and Y-coordinate. Consequently, the processing of the data analyzing block 13 goes to step S3.

In step S3, the data analyzing block 13 compares the inputted values of absolute coordinates (X3, Y3) with the minimum coordinate values (Xmin, Ymin) stored in the RAM 18. That is, the data analyzing block 13 determines whether "X3" in the absolute coordinates (X3, Y3) is larger or smaller than "Xmin" of the minimum coordinate values (Xmin, Ymin).

At the same time, the data analyzing block 13 determines whether "Y3" in the absolute coordinates (X3, Y3) is larger or smaller than "Ymax" of the maximum coordinate values (Xmax, Ymax). At this moment, the absolute values (X3, Y3) at point G3 are smaller than the minimum coordinate values (Xmin, Ymin) at point G2 in both X-coordinate and Y-coordinate. Consequently, the processing of the data analyzing block 13 goes to step S4.

In step S4, the data analyzing block 13 updates the value of "Xmin" to "X3" and the value of "Ymin" to "Y3." Consequently, as shown in FIG. 4, the effective area on the operating surface SF is changed from Q1 to Q2 because the minimum coordinate values (Xmin, Ymin) stored in the RAM 18 are replaced by the values of absolute coordinates (X3, Y3) at point G3. Then, the processing goes to step S5.

If the values of absolute coordinates (X3, Y3) are found larger than the minimum coordinate values (Xmin, Ymin) in step S4, it indicates that the values of absolute coordinates (X3, Y3) are within the effective area Q1. Consequently, the data analyzing block 13 does not update the data about the minimum coordinate values (Xmin, Ymin) stored in the RAM 18. Then, the processing goes to step S5.

In step S5, based on the maximum coordinate values (Xmax, Ymax) and the minimum coordinate values (Xmin, Ymin) stored in the RAM 18 and the display effective area on the display screen of the display block 16, the data correcting block 14 transforms the values of absolute coordinates (X3, Y3) into display coordinates (X3', Y3') on the display screen of the display block 16.

That is, because the effective area on the operating surface SF is smaller than the display screen of the display block 16, the data correcting block 14 corrects the values of absolute coordinates (X3, Y3) to the values of display coordinates (X3', Y3') according to the ratio of the effective area on the operating surface SF to the display effective area on the display screen of the display block 16 in X-axis direction and Y-axis direction. The data correcting block 14 outputs the corrected values of display coordinates (X3', Y3') to the control block 15. Then, the processing goes to step S6.

In step S6, based on the received values of display coordinates (X3', Y3'), the control block 15 displays the cursor at the coordinates (X3', Y3') on the display screen of the display block 16, by way of example. Then, the coordinate output device PC will not start the operation shown in the flowchart of FIG. 5 until a next event is detected by the coordinate detector PD.

Then, it is assumed that the user touches point G5 shown in FIG. 4 with the finger M and slides the same to point G4 on the operating surface SF and then moves the finger M away from the same at point G4. At this moment, the data processing block 12 detects a tapping operation based on the information received from the coordinate detector PD.

At the same time, however, based on the information about the slide component received from the coordinate detector PD, the data processing block 12 detects that the finger M has moved from point G5 to point G4 without moving away from the operating surface SF. Consequently, while the finger M is moving from point G5 to point G4, the data analyzing block 13 does not perform the processing shown in the flowchart of FIG. 5 despite the occurrence of an event indicative of tapping.

When the finger M stops at point G4, the data processing block 12 detects, from the information about the slide component received from the coordinate detector PD, the stop of the finger M at point G4. The occurrence of an event in the coordinate detector PD and the stop of the finger M make the control block 15 start the processing shown in the flowchart of FIG. 5.

In step S1, the data processing block 12 receives the values of absolute coordinates (X4, Y4) at point G4 on the sensor board 1 from the data processing block 7 through the interface block 8 and the interface block 10. Then, the data processing block 12 outputs the received values of absolute coordinates (X4, Y4) to the data analyzing block 13.

Then, in step S2, the data analyzing block 13 compares the received values of absolute coordinates (X4, Y4) with the maximum coordinate values (Xmax, Ymax) stored in the RAM 18. That is, the data analyzing block 13 determines whether "X4" in the absolute coordinates (X4, Y4) is larger or smaller than "Xmax" in the maximum coordinate values (Xmax, Ymax).

At the same time, the data analyzing block 13 determines whether "Y4" in the absolute coordinates (X4, Y4) is larger or smaller than "Ymax" in the maximum coordinate values (Xmax, Ymax). At this moment, the absolute coordinates (X4, Y4) at point G4 are larger than the maximum coordinate values (Xmax, Ymax) at point G2 in both X-coordinate and Y-coordinate. Therefore, the processing of the data analyzing block 13 goes to step S7.

In step S7, the data analyzing block 13 updates the value of "Xmax" to "X4" and the value of "Ymax" to "Y4." As a result, as shown in FIG. 4, the effective area on the operating surface SF is changed from Q2 to Q3 because the maximum coordinate values (Xmax, Ymax) have been replaced by the values of absolute coordinates (X4, Y4). Thus, the effective area becomes the effective area Q3 shown in FIG. 4, expanding up to the inner circumference of the opening K. Then, the processing goes to step S5.

In step S5, the data correcting block 14 transforms the values of absolute coordinates (X4, Y4) into the display coordinates (X4', Y4') on the display screen of the display block 16 based on the maximum coordinate values (Xmax, Ymax) and minimum coordinate values (Xmin, Ymin) stored in the RAM 18 and the display effective area on the display screen of the display block 16.

That is, because the effective area on the operating surface SF is smaller than the display screen of the display block 16, the data correcting block 14 corrects the values of absolute coordinates (X4, Y4) to the values of display coordinates (X4', Y4') according to the ratio of the effective area on the operating surface SF to the display effective area on the display screen of the display block 16 in X-axis direction and Y-axis direction. The data correcting block 14 outputs the corrected values of display coordinates (X4', Y4') to the control block 15. Then, the processing goes to step S6.

In step S6, based on the received values of display coordinates (X4', Y4'), the control block 15 displays the cursor at the coordinates (X4', Y4') on the display screen of the display block 16, by way of example. Then, the coordinate output device PC will not start the operation shown in the flowchart of FIG. 5 until a next event is detected by the coordinate detector PD.

By storing the updated maximum coordinate values (Xmax, Ymax) and minimum coordinate values (Xmin, Ymin) in the RAM 18, the effective area falls within the range of the effective area Q3 resulted from the correction when the coordinate input apparatus is restarted next. In addition, by not storing the updated maximum coordinate values (Xmax, Ymax) and minimum coordinate values (Xmin, Ymin) in the RAM 18, the effective area falls within the initially set range of the effective area Q1 when the coordinate input apparatus is restarted next.

As described above, the coordinate input apparatus practiced as one preferred embodiment of the invention rewrites, by use of the values of absolute coordinates (X, Y) indicated by the finger M, the maximum coordinate values (Xax, Ymax) and the minimum coordinate values (Xmin, Ymin) f or defining the effective area. Consequently, the effective area can be expanded from the preset effective area Q1 to the inner circumference of the opening K.

Therefore, initially setting the maximum coordinate values (Xmax, Ymax) and the minimum coordinate values (Xmin, Ymin) so that the effective area Q1 is sufficiently smaller than the inner circumference of the opening K converges the operating surface SF inside the inner circumference of the opening K to the effective area Q3 while the user operates the operating surface SF with the finger M even if the installation position of the sensor board 1 relative to the opening K shifts from product to product. Thus, the shift of the pointing effective area between products is eliminated.

In the above description, the coordinate detector (pad, touch pad, or the like) PD is an external device for use in coordinate inputting in a desktop personal computer. It will be apparent that the coordinate detector PD may also be used as built in a note-type personal computer. It is also practicable for the coordinate detector PD to take the functional portions of the coordinate output device PC except for the display block 16 to constitute a coordinate input apparatus. To be more specific, a tapping operation of the finger M is detected and, in response to the effective area updated at that point of time, the values of absolute coordinates (X, Y) at the position to which the finger M touches are corrected to a state in which these values can be transformed to the display coordinates (X', Y') to be displayed on the display screen of the personal computer, the corrected values being outputted to the personal computer. This allows the personal computer to transform the values of absolute coordinates (X, Y) to the values of the display coordinates (X', Y') at a preset ratio, displaying the resultant coordinates on the display screen of the display block.

In addition, the effective area on the operating surface can also be calibrated on products having different sizes of the opening K of the touch pad operating surface SF, thereby enabling the same sensor board 1 to be applied to other types of coordinate input apparatuses. To be more specific, the initially set effective area on the sensor board 1 is adapted to a coordinate input apparatus having a smallest opening and the effective area to be initially set as shown in FIG. 4 is set small enough as compared with the opening of this coordinate input apparatus. This constitution allows the same sensor board to be applied to any coordinate input apparatus having an opening larger than that of the above-mentioned coordinate input apparatus without performing special processing.

While the preferred embodiments of the present invention have been described using specific terms, such description is for illustrative purposes only, and it is to be understood that changes and variations may be made without departing from the spirit or scope of the appended claims.

What is claimed is:

1. A coordinate input apparatus comprising:

coordinate detecting device installed on a case so as to be exposed through a window provided on said case, said coordinate detecting device being provided with an operating surface having a predetermined size that is operated with a coordinate indicating means, a position indicated by said coordinate indicating means on said operating surface being outputted as input coordinate data about two-dimensional coordinates;

a storage device for storing range coordinate data about two-dimensional coordinates indicative of a rectangular coordinate input range in which a coordinate input operation is performed by said coordinate indicating means on said operating surface;

a data analyzing device for changing said range coordinate data according to said input coordinate data inputted by said coordinate indicating means;

a data correcting device for transforming, based on said range coordinate data, said input coordinate data into display coordinate data corresponding to coordinates on a display screen of an image display device; and a display control device for displaying said display coordinate data to said display screen of said image display device, wherein said range coordinate data is comprised of minimum coordinate data and maximum coordinate data indicative of said rectangular coordinate input range, wherein, if said input coordinate data is smaller than said minimum coordinate data, said data analyzing device replaces the minimum coordinate data of said range coordinate data with said input coordinate data to generate a revised coordinate data range, wherein, if said input coordinate data is larger than said maximum coordinate data, said data analyzing device replaces the maximum coordinate data of said range coordinate data with said input coordinate data to generate a revised coordinate data range, and wherein, if said range coordinate data has been replaced with said input coordinate data to generate a revised coordinate range, said data correcting device transforms said input coordinate data into display coordinate data by comparing the range coordinate data with the revised coordinate data range.

2. The coordinate input apparatus according to claim 1, wherein said rectangular coordinate input range is set inside a frame of said window.

3. A coordinate input apparatus according to claim 1, wherein the data correcting device transforms the input coordinate data into display coordinate data by comparing the range coordinate data with the revised coordinate data range so that an effective area of the operating surface of the coordinate input device is commensurate with an effective area of the display screen of the image display device.

4. A coordinate input apparatus according to claim 3, wherein the data correcting device transforms the input coordinate data into display coordinate data by applying the following formula:

$$(X', Y') = a*(X, Y) + b$$

where $(X', Y')$ is the display coordinate data, $(X, Y)$ is the input coordinate data, and "a" and "b" are constants determined by comparing the range coordinate data with the revised coordinate data range such that the effective area of the operating surface of the coordinate input device is commensurate with the effective area of the display screen of the image display device.

5. A coordinate input apparatus according to claim 1, further comprising a tap/slide component extract device for determining whether the coordinate indicating means is being tapped or slid on the operating surface of the coordinate input device.

* * * * *